United States Patent [19]
Mitsui et al.

[11] Patent Number: 5,465,099
[45] Date of Patent: Nov. 7, 1995

[54] DETECTABLE DEVICE AND MOVABLE ITEM DETECTING SYSTEM

[75] Inventors: Tsutomu Mitsui; Noriyuki Akaba; Yukitsugu Shimokawa, all of Tokyo, Japan

[73] Assignee: Nippon Information Industry Corporation, Tokyo, Japan

[21] Appl. No.: 296,859

[22] Filed: Aug. 26, 1994

Related U.S. Application Data

[63] Continuation of Ser. No. 946,952, Sep. 17, 1992, abandoned.

[30] Foreign Application Priority Data

Sep. 25, 1991 [JP] Japan ..................... 3-245415

[51] Int. Cl.⁶ ......................................... H01Q 1/00
[52] U.S. Cl. ............. 343/730; 343/729; 343/701
[58] Field of Search ...................... 343/730, 701, 343/729, 720, 725, 726, 727, 728, 866; H01Q 1/00

[56] References Cited

U.S. PATENT DOCUMENTS

| | | | |
|---|---|---|---|
| 3,707,711 | 12/1972 | Cole et al. ............ | 343/700 MS |
| 4,123,754 | 10/1978 | Armstrong .................. | 331/55 |
| 4,588,993 | 5/1986 | Babij et al. ............... | 343/703 |
| 5,038,405 | 8/1991 | Karr ........................ | 343/745 |

FOREIGN PATENT DOCUMENTS

| | | | |
|---|---|---|---|
| 62-226080 | 10/1987 | Japan ................ | G01S 13/82 |
| 62-273475 | 11/1987 | Japan ................ | G01S 13/74 |

*Primary Examiner*—Donald T. Hajec
*Assistant Examiner*—Hoanganh Le
*Attorney, Agent, or Firm*—David O'Reilly

[57] ABSTRACT

A detectable device attachable to a movable item for detecting movement. Radio waves having a predetermined frequency are received by the detectable device, and radio waves having a harmonic frequency of the received waves are reradiated from the detectable device. The detectable device comprises a dipole antenna for receiving radio waves with said predetermined frequency, a diode connected in parallel to feed points of the dipole antenna for generating an electric current having a harmonic frequency of said received radio waves. A loop antenna is provided whose feed points are connected in parallel to feed points of the diode for converting the electric current having the harmonic frequency to radio waves for transmitting the radio waves at the harmonic frequency.

8 Claims, 4 Drawing Sheets

F I G. 1
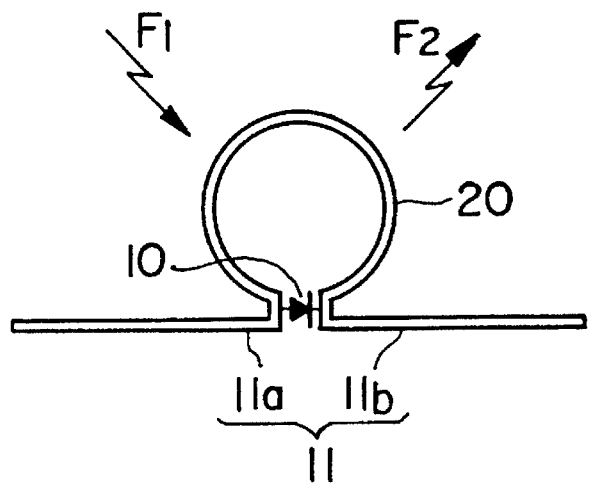
F I G. 2
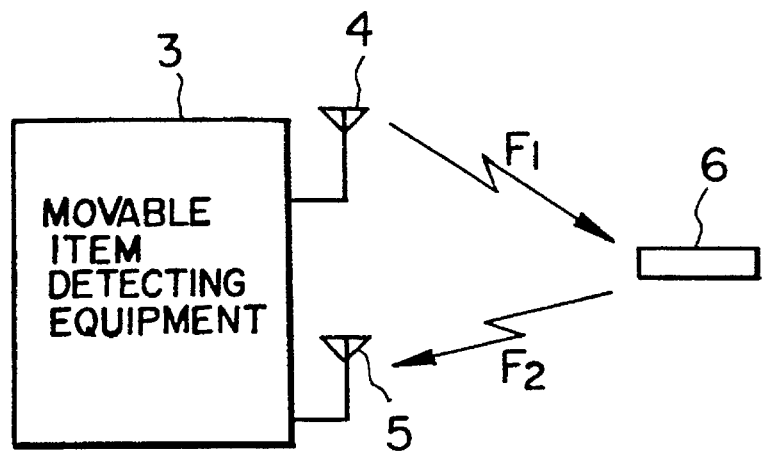
F I G. 3
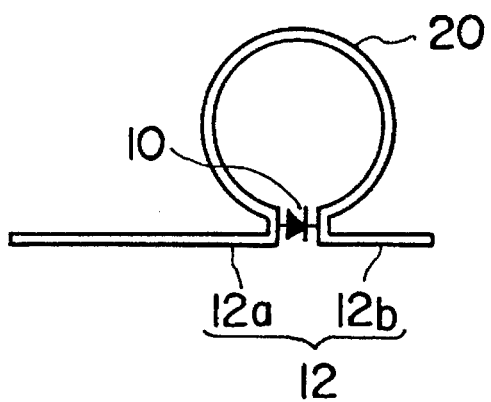

1

DETECTABLE DEVICE AND MOVABLE ITEM DETECTING SYSTEM

This is a continuation of application Ser. No. 07/946,952 filed on 17 Sep. 1992 now abandoned.

BACKGROUND OF THE INVENTION

1. Field of the Invention

The present invention relates to a detectable device, and particular to a detectable device for attachment to movable items such as a magnetic tape in which data such as personal information is stored, other goods or the like in order to prevent unauthorized removal of a movable item, and further relates to a movable item detecting system comprising the detectable device and movable item detecting equipment, for detecting when a movable item is moved. In the specification, "detectable device" means a device in which radio waves transmitted from movable item detecting equipment is received and from which radio waves having a harmonic frequency are reradiated. The harmonic frequency is an integral multiple of the frequency of the received wave.

2. Description of the Invention

One example of the above-mentioned conventional detectable device is disclosed in Japanese Patent Laying-Open No. 226080 of 1987. FIG. 11 shows this detectable device.

The detectable device comprises a receiving antenna 1a, a diode 1d, and a transmitting antenna 1b. Receiving antenna 1a is connected through diode 1d to transmitting antenna 1b. DC biased coil 1c is connected in parallel with diode 1c. Radio waves of different frequencies Fa and Fb from each other sent from the movable item detecting equipment are received by the receiving antenna 1a of the detectable device, and supplied anode side of diode 1d. In the diode 1d, two frequencies Fa and Fb are converted to a frequency Fc being equal to either the difference between frequencies Fa and Fb or the sum of frequencies Fa and Fb. Radio waves having the frequency Fc are radiated from transmitting antenna 1b mounted on the cathode side of the diode 1d.

Another example of detectable device is disclosed in Japanese Patent Laying-Open No. 273475 of 1987. FIG. 12 shows this detectable device.

This detectable device comprises receiving antenna 2a and 2b, diode 2e, and transmitting antenna 2c and 2d. One end of the receiving antenna 2a and one end of the receiving antenna 2b are connected with the diode 2e on the anode side thereof, while the other end of receiving antenna 2a and 2b are connected with diode 2e on the cathode side thereof. One end of transmitting antenna 2c is connected with the anode side of diode 2e, while one end of the transmitting antenna 2d is connected with the cathode side of diode 2e. Radio waves sent from the transmitting equipment of the movable item detecting equipment are received by the receiving antenna 2a and 2b, its frequency converted to harmonic frequencies of the received radio waves, and radiated from the transmitting antennas 2c and 2d. Receiving antenna parts 2a and 2b form part of one folded dipole antenna. The total electric length of the receiving antenna 2a and 2b is equal to a half of the wave length of the received radio waves. The transmitting antenna 2c and 2d forms part of a dipole antenna of which total electric length is equal to a half of the wave length of one of the harmonic waves generated in the diode 2e, therefore the potential difference generated between both terminals of the diode 2e is high enough to generate the harmonic frequency components.

However, in the former example shown in FIG. 11, both radio waves with frequencies Fa and Fb sent from movable item detecting equipment are received by the receiving antenna 1a of the detectable device, and converted to frequency Fc being equal to either the difference between frequencies Fa and Fb or the sum of frequencies Fa and Fb. Therefore, a single antenna which can be operated with these three frequencies should be mounted on the detectable device, or three antennas which fit the respective frequencies should be mounted on the detectable device. Therefore, the structure is complicated and bulky. Further, miniaturization of the device is difficult. Furthermore, since a capacity between both terminals of the diode exists, current flowing through the diode becomes small at high frequencies so that the effective frequency conversion is quite difficult.

On the other hand, in the latter example shown in FIG. 12, the electric length of the receiving antenna 2a and 2b is equal to a half of the received wave length. At a comparatively high frequency of about 1 GHz used practically, the length of antenna reachs the order of 150 mm. Even if the antenna is folded, the size of the antenna reaches the order of 75 mm through 50 mm. Further, the transmitting antenna has a length of 75 mm. Therefore, the detectable device is too large to be attached to small-sized goods. To miniaturize the detectable device, the antenna must be shortened. However, the shorter the length of the antenna becomes, the lower the radiation resistance becomes. On the other hand, a diode has high impedance. Therefore, the impedance matching of the receiving antenna and the diode is imppossible so that sufficient electric power cannot be sent to the transmitting antenna.

As above-mentioned, conventional detectable devices have problems that the smaller the detectable device is made, the lower the radiation resistance becomes. Therefore impedance matching of the receiving antenna and the diode is impossible, by which electric power applied to the diode is made smaller, which makes the effective reradiation of radio waves having the harmonic frequencies impossible.

BRIEF SUMMARY OF THE INVENTION

It is an object of the invention to provide a detectable device which is small in size and has high reradiation efficiency.

It is a further object of the invention to provide a movable item detecting system for detecting when a movable item has been removed.

The first object of the invention is attained by a detectable device or tag attached to a movable item, which receives radio waves having a predetermined frequency and, after receipt thereof, reradiates harmonic radio waves of said received radio waves. The detectable device comprises a dipole antenna for receiving radio waves having said predetermined frequency for converting the radio waves to electric currents having said predetermined frequency, a diode connected in parallel to feed points of the dipole antenna for generating the electric currents having a harmonic frequency of said received radio waves, and a loop antenna whose reed points are connected in parallel to feed points of the diode for converting the electric currents having the harmonic frequency to radio waves and for transmitting the radio waves at the harmonic frequency, In the detectable device accoding to the present invention, the dipole antenna may be an asymmetric dipole antenna. Further, part of the dipole antenna may be common to part of the loop antenna.

Furthermore, in the detectable device according to the present invention, a resonance circuit resonating at the predeterminded frequency is formed of the diode and the loop antenna.

The lengths of the dipole antenna and the loop antenna can be smaller than the resonant lengths of the respective antennas.

Furthermore, according to the present invention, the movable item detecting system comprises a detectable device attached to a movable item which receives radio waves having a predetermined frequency and, after receipt thereof, reradiates harmonic radio waves of said received radio waves, and movable item detecting equipment comprising a transmitter for transmitting radio waves at said predeterminded frequency within a predetermined space and a receiver for receiving radio waves having said harmonic frequency from the detectable device existing in the space so that the movable device detecting device can detect movement of the item. The detectable device comprises a dipole antenna for receiving radio waves having said predetermined frequency for converting the radio waves to electric currents having said predetermined frequency, a diode connected in parallel to feed points of the dipole antenna for generating the electric currents having a harmonic frequency of said received radio waves, and a loop antenna whose feed points are connected in parallel to feed points of the diode for converting the electric currents having the harmonic frequency to radio waves and for transmitting the radio waves at the harmonic frequency.

According to the present invention, radio waves having the predetermined frequency $F_1$ sent within the predeterminded space from the movable item detecting equipment are received by the dipole antenna, and current generated thereby flows through the diode. Generally, since the diode has a capacity between both terminals thereof, current having high frequency cannot flow through the diode. However, by using the inductance of the loop antenna connected in parallel with the diode and by adjusting the inductance of the loop antenna, a parallel resonance circuit is formed, and thus current flowing through the diode can be maximized. Accordingly, the harmonic component's energy gain can be effectively increased.

The resonance circuit formed of the diode and the loop resonates at the predetermined frequency $F_1$. Therefore, when current having frequency $F_2$ flows in the loop antenna, the loop antenna acts as the transmitting antenna, from which radio waves with frequency $F_2$ can be reradiated.

In the detectable device according to the present invention, the diode acts as a current-exciting-typed multiplier. Therefore, substancial internal resistance of the diode can be reduced as compared with the conventional voltage-exciting-typed multiplier in the conventional instance. Accordingly, even though the radiation resistance of the antenna is lowered by making the length of the antenna smaller than the resonant wave length, impedance matching can be attained with ease as compared with the conventional instance so that the minituarization of the antennas and detectable device can be achieved.

BRIEF DESCRIPTION OF THE DRAWINGS

In the drawings:

FIG. 1 is a schematic drawing of a first embodiment of the detectable device according to the present invention in which the principle of the first embodiment is shown;

FIG. 2 is a schematic representation of the movable item detecting system according to the present invention formed of the detectable device and movable item detecting equipment;

FIG. 3 is a schematic drawing of a second embodiment of the detectable device according to the present invention;

DETAILED DESCRIPTION

Figure 4:
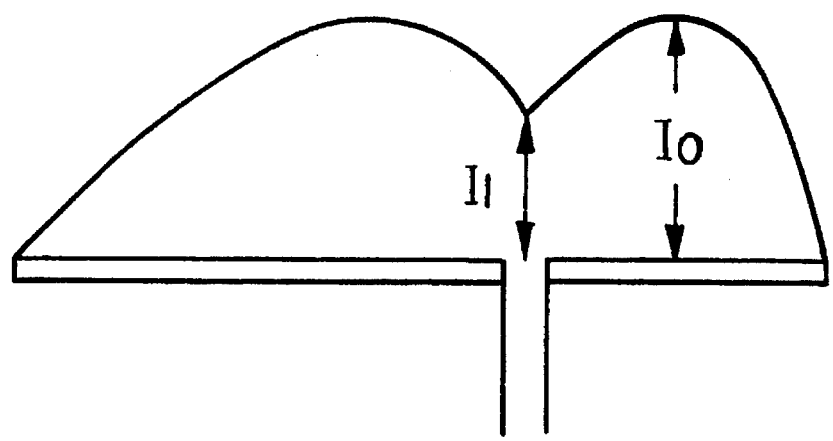
FIG. 4 is a schematic representation of the current distribution when the receiving antenna is asymmetric.

Then, the present invention is explained in detail referring to the drawings. In the drawings, FIG. 1 is a schematic drawing of the first embodiment of a detectable device or tag according to the present invention in which the principle of the first embodiment is shown, FIG. 2 is a schematic representation of the movable item detecting system according to the present invention which is formed of detectable device 6 and movable item detecting equipment 3.

Referring to FIG. 1, a detectable device according to the present invention comprises a dipole antenna 11 as a receiving antenna composed of dipole antenna components 11a, 11b, a loop antenna 20 as a transmitting antenna, and diode 10. Both terminals of the diode 10 are connected with respective ends of the dipole antenna components 11a and 11b on the inner side of the dipole antenna 11 and with both ends of the loop antenna 20.

Radio waves having the predetermined frequency $F_1$ sent from a transmitting antenna 4 of the movable item detecting equipment 3 shown in FIG. 2 are radiated in a predetermined space. When a movable item provided with the detectable device 6 enters this space, waves sent from the transmitting antenna 4 are received by the dipole antenna 11. The frequency of current flowing through the dipole antenna components 11a, 11b is multiplied by the diode which is connected in parallel with the dipole antenna. Components having a frequency being an integral multiple of the specific frequency $F_1$ are generated by the diode. Among these frequency components, for example, waves having a harmonic frequency $F_2$ two times as high as the predetermined frequency $F_1$ are reradiated.

The waves with frequency $F_2$ reradiated from the loop antenna 20 are received by a receiving antenna 5 of the movable item detecting equipment 3, by which the presence of the movable item in the space is confirmed. The confirmation information is utilized for preventing the removal of goods provided with the detectable device 6.

The diode 10 has a capacity between terminals thereof. The inductance of the loop antenna is adjusted to the extent that the capacity and inductance of the loop antenna forms a parallel resonance circuit which resonates with predetermined frequency $F_1$, by which current with a specific frequency F can be maximized.

In this embodiment, the diode is used as a multiplying device. In this respect, the detectable device according to the present invention is the same as conventional equipment. However, this embodiment is superior to conventional equipment in the easiness of impedance matching and the miniaturization of equipment as follows.

Generally, the radiation resistance of an antenna decreases, as the length of the anntenna becomes shorter than the resonant electric length. For example, radiation resistance at the resonant electric length of a dipole antenna is about 75 Ω. However, as the length of the antenna becomes shorter, the radiation resistance decreases rapidly to about several Ω (ohms). On the other hand, since the resistance of the diode is about 200 Ω, impedance matching is important for decreasing the length the antenna, that is for the miniaturization of the antenna. In conventional cases impedance matching has been very difficult, because antennas should be connected in series with a diode in this configuration. Therefore, an additional matching circuit has been required in conventional cases. On the other hand, in the present embodiment, the resistance of the diode can be substantially decreased, because the antennas are connected in parallel with a diode. Therefore, in the present embodiment, impedance matching becomes easy, resulting in enabling miniaturization of the antenna, an besides an extra matching circuit is not required. Therefore, the detectable device according to the present invention can be used over a wide band, and the influence of a dispersion of capacity between terminals of the diode can be decreased.

Further, an imaginary part of impedance of each antenna can be included in the calculation as a part of the above mentioned resonance circuit. Accordingly, high radiation efficiency can be obtained by making the structure of a loop antenna most suitable according to the required frequency and Q value.

A second embodiment of the detectable device according to the present invention is explained as follows.

Referring to FIG. 3, the second embodiment is substantially the same as the first embodiment except dipole antenna components 12a, 12b have different lengths from each other so that the dipole antenna is asymmetric.

FIG. 4 shows current distribution when the dipole antenna is asymmetric. As apparent from the figure, the feed point of the dipole antenna is offset so that the maximum point of current is shifted to the right or left from the feed point. If current at the maximum point is represented by $I_o$ and current at the feed point is represented by $I_1$, then the input resistance $R_1$ of the dipole antenna is formulated by:

$$R_1=(I_o/I_1)^2R_o.$$

In the second embodiment, the resistance of the dipole antenna can be increased over the case where the dipole antenna is symmetric. Accordingly, impedance matching becomes much easier.

The second embodiment is effective particularly when the matching of resistance becomes difficult depending on the type of diode to be used or the relation between the length of antenna and value of frequency to be used.

Figure 5:
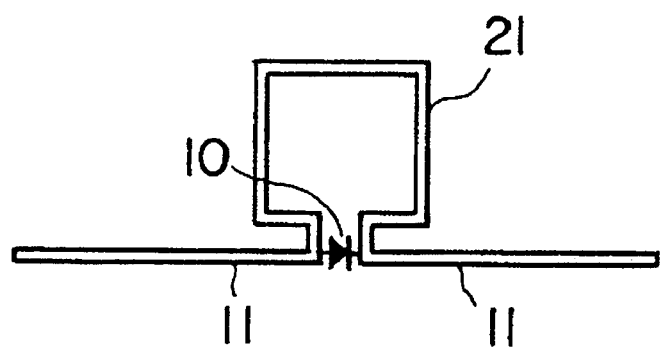
FIG. 5 is a schematic drawing of a version of the detectable device according to the present invention.

FIG. 5 shows a version of the detectable device according to the present invention. This third embodiment is substantially the same as the first embodiment except the circular loop antenna is replaced by a rectangle loop antenna 21. It should be noted that even with such a loop antenna shape the third embodiment can be operated in the same manner as the first embodiment.

Figure 6:
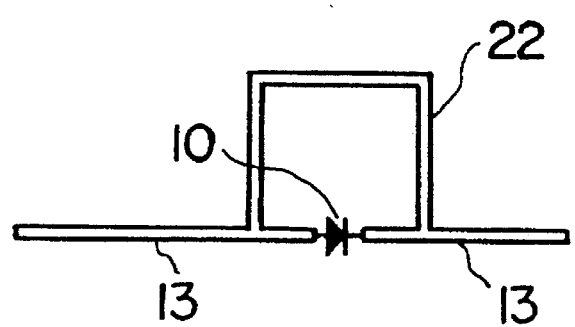
FIG. 6 is a schematic drawing of a fourth embodiment according to the present invention.

FIG. 6 shows the fourth embodiment according to the present invention, in which a part of the conductor of a dipole antenna component 13 is common to a part of the conductor of a loop antenna 22, resulting in obtaining further miniaturization of the detectable device. Since both the dipole antenna 13 and the loop antenna 22 are linear elements and the operating frequency of the dipole antenna 13 differs from the operating frequency of the loop antenna 22, even though a part of the conductor of a dipole antenna component 13 is common to a part of the conductor of a loop antenna 22, both antennas can be operated without being influenced by each other on the principle of superposition.

FIGS. 7 through 10 show examples of structures of a practical detectable device based on the above-mentioned principle.

Figure 7:
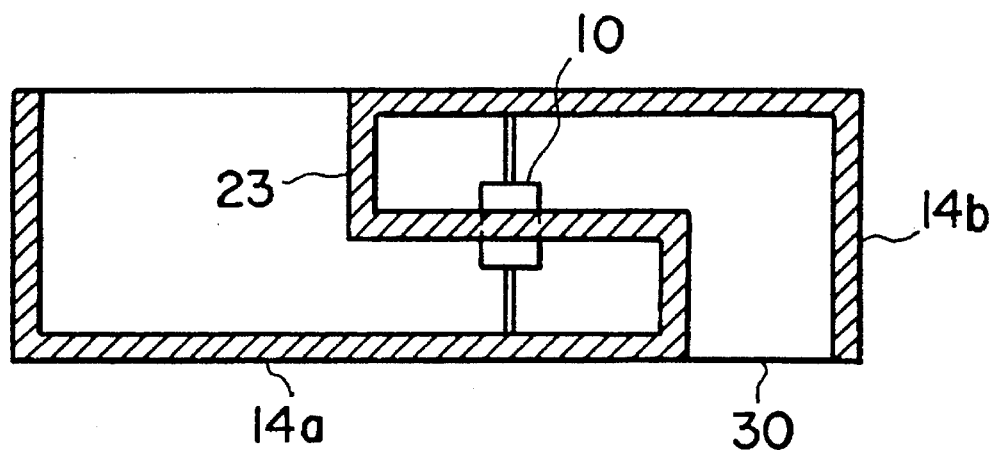
FIGS. 7 through 10 are examples of various structures of the detectable device in which each example differs from each other by the point in which diode is connected to conductive patterns forming antennas.

The structure of detectable device shown in FIG. 7 is one example thereof. On a dielectric substrate 30, first, second, and third conductive patterns 14a, 14b, and 23 are formed of metallic film. A diode 10 is attached to the first, second, and third conductive patterns 14a, 14b, and 23 by, a conventional method so that both terminals of the diode are connected with the first, second, and third conductive patterns 14a, 14b, and 23. The first and second conductive patterns 14a, and 14b form a dipole antenna, and the third conductive pattern 23 forms a loop antenna. In this example, for a frequency of 1 through 2 GHz, the size is 45 mm in length and 10 mm in width, which is smaller than that of a conventional example.

Figure 8:
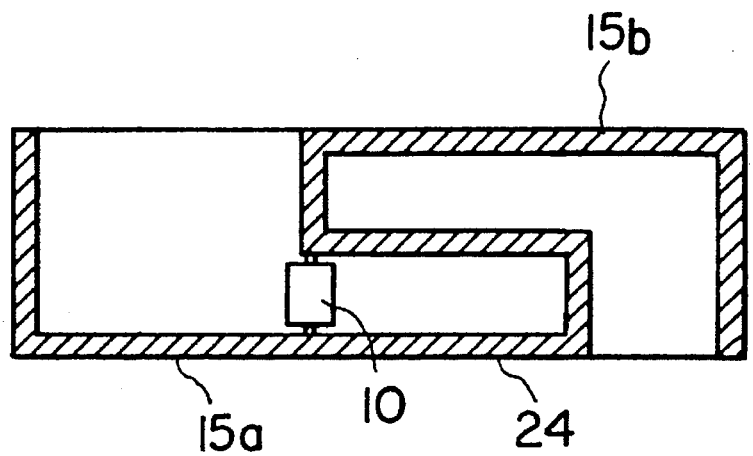
Figure 9:
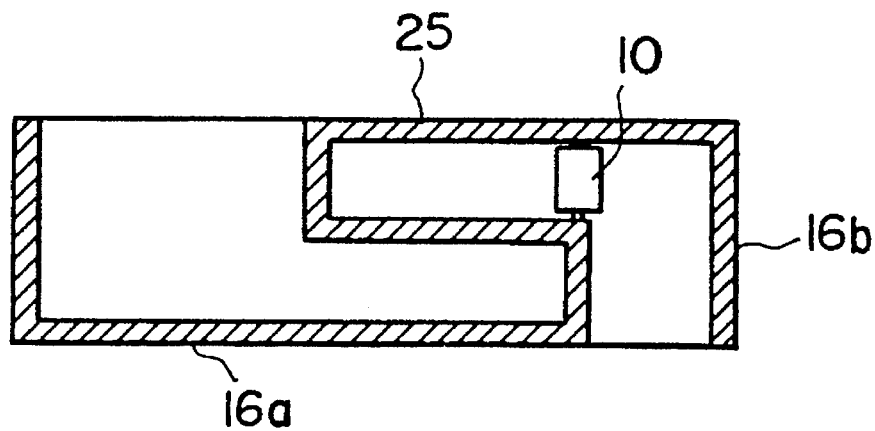

FIGS. 8 and 9 show other examples of detectable devices according to the present invention. They differ from the above-mentioned example shown in FIG. 7 only by diodes connected to different points from that of the above-mentioned example shown in FIG. 7. In the example shown in FIG. 8, conductive patterns 15a, 15b form a dipole antenna, and a conductive pattern 24 forms a loop antenna. In the example shown in FIG. 9, conductive patterns 16a, 16b form a dipole antenna, and a conductive pattern 25 forms a loop antenna. The examples shown in FIGS. 7, 8 and 9 are within the scope of the claims and the same principle can be applied. Even if the same design for conductive patterns are applied, there is a case where the desired radiation efficiency cannot be obtained by some diodes. In such a case, the position where a diode is attached to conductive patterns is changed to the position shown in FIGS. 8 and 9 so that adjustment of radiation efficiency can be achieved without conductive patterns on a dielectric substrate 30 being changed.

Figure 10:
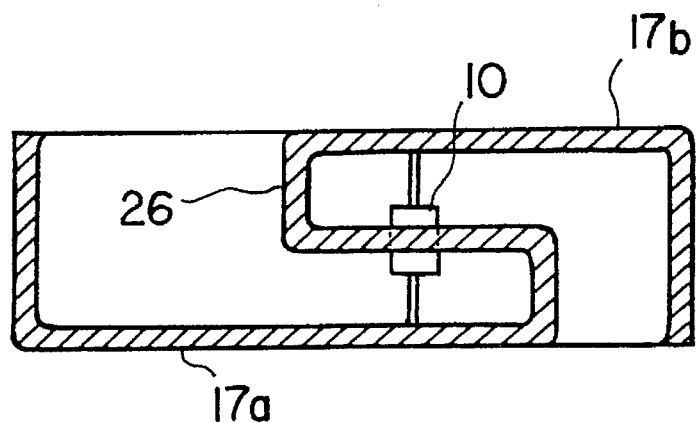
Figure 11:
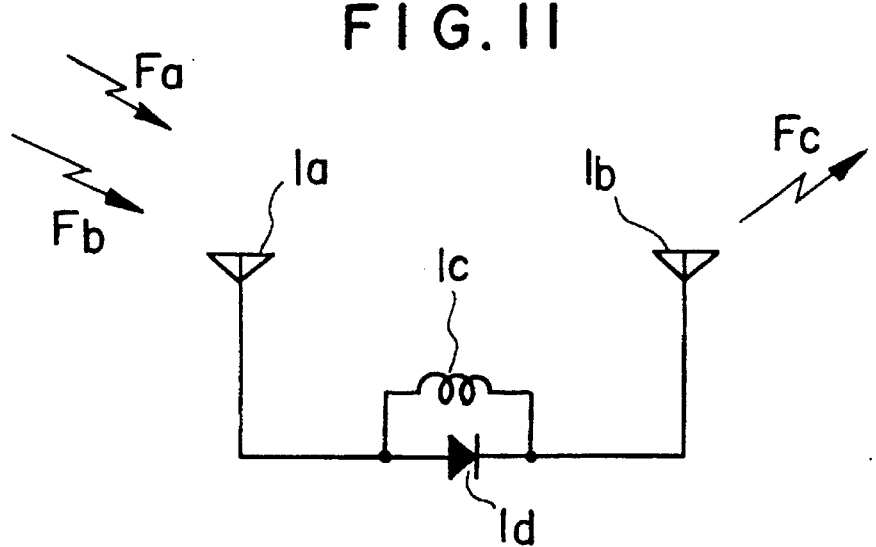
FIG. 11 is a schematic representation of one example of conventional detectable device.
Figure 12:
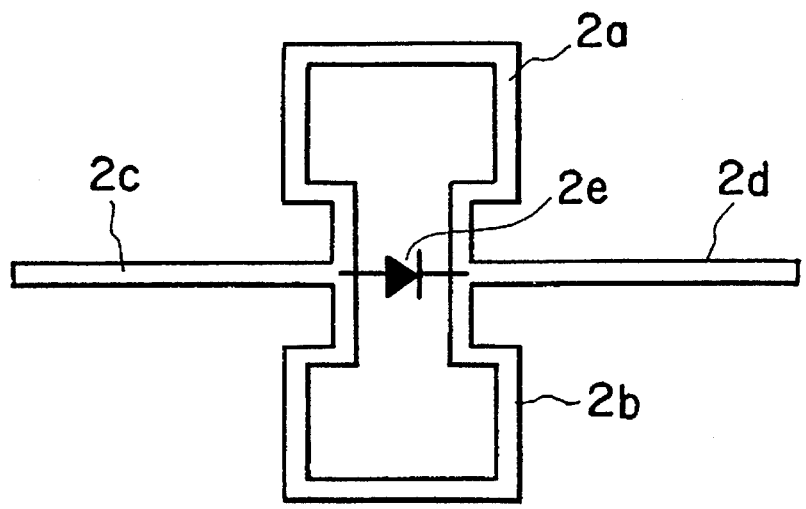
FIG. 12 is a schematic representation of another example of conventional detectable device.

FIG. 10 shows a further example where corners of conductive patterns are rounded. By the structure shown in FIG. 10, reflection at corners of conductive patterns can be suppressed so that the efficiency of an antenna can be increased. In the example shown in FIG. 10, conductive patterns 17a and 17b form a dipole antenna and a conductive pattern 26 forms a loop antenna.

Further, the conductor may be beveled at the rims thereof along the conductive patterns, not shown in figures. By such a structure, reflection at the rims can be also suppressed so that the efficiency of an antenna can be increased.

What is claimed is:

1. A detectable device attachable to a movable item that receives radio waves at a predetermined frequency and, after receipt thereof, reradiates harmonic radio waves of said received radio waves, the device comprising;

a dipole antenna for receiving and converting said radio waves at said predetermined frequency to an electric current at said predetermined frequency, the length of said dipole antenna being selected to be less than one-half the wavelength of said predetermined frequency so that said dipole antenna acts as a capacitance at said predetermined frequency;

a diode provided at feed points of said dipole antenna for generating an electric current at a frequency that is a harmonic of said received radio waves; and a loop antenna whose feed points are connected in parallel to said diode for converting the electric current at said harmonic frequency to radio waves and transmitting the radio waves at said harmonic frequency, said loop antenna having a length selected that is less than the wavelength of said predetermined frequency that will cause the reactance of said loop antenna to be positive so that said loop antenna acts as an inductance at said predetermined frequency;

a compound capacitance of said dipole antenna and said diode and the inductance of said loop antenna constituting a parallel resonant circuit resonating at said predetermined frequency;

whereby current flowing through said diode is substantially increased.

2. The detectable device as claimed in claim 1, wherein the dipole antenna is an asymmetric dipole antenna.

3. The detectable device as claimed in claim 1, wherein part of the dipole antenna is common to part of the loop antenna.

4. A movable item detecting system comprising; a detectable device attachable to a movable item that receives radio waves at a predetermined frequency and reradiates radio waves at a harmonic frequency of said received radio waves, and movable item detecting equipment having a transmitter for transmitting radio waves at said predetermined frequency within a predetermined space and a receiver for receiving radio waves at said harmonic frequency from the detectable device existing in the space so that the movable item detecting equipment can detect the movable item, wherein the detectable device comprises;

a dipole antenna for receiving radio waves having said predetermined frequency and converting said radio waves to an electric current at said predetermined frequency, said dipole antenna having a length that is less than one-half the wavelength of said predetermined frequency so that said dipole antenna acts as a capacitance at said predetermined frequency;

a diode connected in parallel to feed points of the dipole antenna for generating an electric current that is a harmonic frequency of said received radio waves;

a loop antenna whose feed points are connected in parallel to said diode for converting the electric current at said harmonic frequency to radio waves for transmitting the radio waves at the harmonic frequency, said loop antenna having a length selected that is less than the wavelength of said predetermined frequency that will cause the reactance of said loop antenna to be positive so that said loop antenna acts as an inductance at said predetermined frequency;

a compound capacitance of said dipole antenna and said diode and said inductance of said loop antenna being a parallel resonant circuit resonating at said predetermined frequency;

whereby said electric flowing through said diode is substantially increased.

5. A detectable device attachable to a movable item to detect movement of said item, said detectable device receiving radio waves at a predetermined frequency and reradiating harmonics of said received radio waves, the improvement comprising;

a dipole antenna receiving and converting said radio waves at said predetermined frequency to an electric current at a predetermined frequency, said dipole antenna having a length that is less than one-half the wavelength of said predetermined frequency so that said dipole antenna acts as a capacitance at said predetermined frequency;

a diode connected in parallel to feed points of the dipole antenna for generating an electric current that is a harmonic frequency of said received radio waves; and a loop antenna whose feed points are connected in parallel to said diode for converting the electric current at said harmonic frequency to radio waves for transmitting the radio waves at the harmonic frequency, said loop antenna having a length selected that is less than the wavelength of said predetermined frequency that will cause the reactance of said loop antenna to be positive so that said loop antenna acts as an inductance at said predetermine, frequency;

said compound capacitance of a dipole antenna and said diode and said inductance of said loop antenna being a parallel resonant circuit resonating at said predetermined frequency;

whereby said electric flowing through said diode is substantially increased.

6. A device according to claim 5 in which said dipole antenna is an asymmetric dipole antenna.

7. A device according to claim 5 in which part of said dipole antenna is common to part of said loop antenna.

8. A movable item detecting system comprising; a detectable device attachable to a movable item to detect movement of said item, said detectable device receiving radio waves at a predetermined frequency and reradiating harmonics of said receiving radio waves; detecting equipment for detecting movement of said detectable device having a transmitter for transmitting radio waves at said predetermined frequency in a predetermined space and a receiver for receiving radio waves at said harmonics of said predetermined frequency from said detectable device for detecting movement of a movable item in said predetermined space; and detectable device comprising;

a dipole antenna receiving and converting said radio waves at said predetermined frequency to an electric current at said predetermined frequency, said dipole antenna having a length that is less than one-half the wavelength of said predetermined frequency so that said dipole antenna acts as a capacitance at said predetermined frequency;

a diode connected in parallel with feed points of said dipole antenna for generating an electric current at a frequency that is harmonic of said predetermined frequency of said received radio waves; and a loop antenna having feed points connected in parallel with said diode for transmitting the harmonic frequency of said radio waves converted by said diode, said loop antenna having a length selected that is less than the wavelength of said predetermined frequency that will cause the reactance of said loop antenna to be positive so that said loop antenna acts as an inductance at said predetermined frequency;

a compound capacitance of said dipole antenna and said diode and said inductance of said loop antenna being a parallel resonant circuit resonating at said predetermined frequency;

whereby said electric flowing through said diode is substantially increased.

* * * * *

UNITED STATES PATENT AND TRADEMARK OFFICE
CERTIFICATE OF CORRECTION

PATENT NO. : 5,465,099
DATED : November 7, 1995
INVENTOR(S) : Tsutomu Mitsui; Noriyuki Akaba; Yukitsugu Shimokawa It is certified that error appears in the above-identified patent and that said Letters Patent is hereby corrected as shown below:

In the cover page under "[73] Assignee:" Change

"Assignee:  Nippon Information Industry Corporation, Tokyo, Japan"

To

-- Assignees:  Nippon Information Industry Corporation, Tokyo, Japan

Tokimec Inc., Tokyo, Japan --

Signed and Sealed this

Nineteenth Day of October, 1999

Attest:

Q. TODD DICKINSON

Attesting Officer

Acting Commissioner of Patents and Trademarks